US012013103B1

(12) United States Patent
Liang

(10) Patent No.: US 12,013,103 B1
(45) Date of Patent: Jun. 18, 2024

(54) CONNECTION STRUCTURE OF STRING LIGHT AND STRING LIGHT ASSEMBLY

(71) Applicant: Nanning Wang Choi Lighting Technology Co., Ltd., Nanning (CN)

(72) Inventor: Faquan Liang, Nanning (CN)

(73) Assignee: Nanning Wang Choi Lighting Technology Co., Ltd., Nanning (CN)

( * ) Notice: Subject to any disclaimer, the term of this patent is extended or adjusted under 35 U.S.C. 154(b) by 0 days.

(21) Appl. No.: 18/238,450

(22) Filed: Aug. 25, 2023

(30) Foreign Application Priority Data

Aug. 7, 2023 (CN) ......................... 202322112785.9

(51) Int. Cl.
*F21V 21/002* (2006.01)
*F21S 4/10* (2016.01)

(52) U.S. Cl.
CPC .............. *F21V 21/002* (2013.01); *F21S 4/10* (2016.01)

(58) Field of Classification Search
CPC ...... F21V 21/002; F21V 21/008; F21V 21/32; F21S 4/10; F21W 2131/109
See application file for complete search history.

(56) References Cited

U.S. PATENT DOCUMENTS 5,964,613 A * 10/1999 Huang .................... F21V 21/32 439/417
2017/0138577 A1* 5/2017 Lin ...................... H02G 15/117
2023/0034293 A1* 2/2023 Wang .................... F21V 23/001

* cited by examiner

*Primary Examiner* — Peggy A Neils

(57) ABSTRACT

Provided are a connection structure of string light and a string light assembly. The connection structure of string light comprises a main wire and a plurality of connecting assemblies, each of the connecting assembly comprises a sub-wire, a housing, a lamp head and a piercing terminal provided with a groove, and the piercing terminal is also provided with a first needle and a second needle; the piercing terminal covers the main wire and the sub-wire through the groove, the first needle pierces a sheath of the main wire and is electrically connected with the main wire, and the second needle pierces a sheath of the sub-wire and is electrically connected with the main wire; and the housing covers the piercing terminal, and an end of the sub-wire far from the piercing terminal passes through the housing and is electrically connected with the lamp head.

9 Claims, 4 Drawing Sheets

CONNECTION STRUCTURE OF STRING LIGHT AND STRING LIGHT ASSEMBLY

CROSS REFERENCE TO RELATED APPLICATIONS

The present application claims the benefit of Chinese Patent Application No. 202322112785.9 filed on Aug. 7, 2023, the contents of which are incorporated herein by reference in their entirety.

TECHNICAL FIELD

The present application belongs to the technical field of light bulb, in particular to a connection structure of string light and a string light assembly.

TECHNICAL BACKGROUND

Light string is a lamp formed by connecting a plurality of bulbs on the same wire harness.

Light string is widely used in outdoor environment for decoration and lighting. Light string includes a main wire and a plurality of sub-wires connected to the main wire, and each sub-wire may be equipped with a bulb, so that the main wire can supply power to the bulbs on multiple sub-wires at the same time.

In the prior art, the connection between the main wire and the sub-wire usually requires to remove the sheaths of the main wire and sub-wire, and the exposed battery core of the main wire are electrically connected with the exposed battery core of the sub-wire. This cable connection method, which needs to remove the sheath, has some problems, such as complicated connection operation and long manufacturing time.

SUMMARY

The present application provides a connection structure of string light and string light assembly, aiming at solving the technical problems of complicated cable connection operation and long manufacturing time in the prior art.

In view of the above technical problems, the embodiments of the present application provide a connection structure of string light, comprising a main wire and a plurality of connecting assemblies, each of the connecting assembly comprises a sub-wire, a housing, a lamp head and a piercing terminal provided with a groove, and the piercing terminal is also provided with a first needle and a second needle; the piercing terminal covers the main wire and the sub-wire through the groove, the first needle pierces a sheath of the main wire and is electrically connected with the main wire, and the second needle pierces a sheath of the sub-wire and is electrically connected with the sub-wire; and the housing covers the piercing terminal, and an end of the sub-wire far from the piercing terminal passes through the housing and is electrically connected with the lamp head.

Optionally, the piercing terminal comprises a first terminal and a second terminal connected with the first terminal, the groove comprises a first groove arranged on the first terminal and a second groove arranged on the second terminal, the first needle is arranged on the first terminal and the second needle is arranged on the second terminal; and the first terminal covers the main wire through the first groove, and the second terminal covers the sub-wire through the second groove.

Optionally, a center line of the first terminal is perpendicular to that of the second terminal.

Optionally, the two opposite sides of the first terminal are provided with the first needles, and the two opposite sides of the second terminal are provided with the second needles.

Optionally, the housing is further provided with a hanger.

Optionally, the connection structure of string light further comprises a plug electrically connected with the main wire.

Optionally, the lamp head comprises a conductive part and an inner sleeve provided with a first inner hole, and an inner wall of the first inner hole is provided an electrode terminal, an end of the conductive part is electrically connected with an end of the sub-wire far from the piercing terminal, and another end of the conductive part extends into the first inner hole and is electrically connected with the electrode terminal.

Optionally, the connecting assembly further comprises an outer sleeve provided with a second inner hole, and an end of the sub-wire far from the piercing terminal extends into the second inner hole and is electrically connected with the conductive part; the inner sleeve and the conductive part are both positioned in the second inner hole.

Optionally, the main wire, the sub-wire and the piercing terminal are all provided with two, and each sub-wire is electrically connected with one main wire through one piercing terminal.

The present application also provides a string light assembly, comprising a plurality of bulbs and the connection structure of string light described above, and each lamp head is used for connecting one bulb.

In the present application, the piercing terminal is provided with a groove, a first needle and a second needle, and the groove of the piercing terminal can cover the main wire and the sub-wire. In the molding process of housing, the housing would drive the first needle and the second needle to bend, so that the first needle could pierce the sheath of the main wire and touch the conductive wire core inside, and the second needle could pierce the sheath of the sub-wire and touch the conductive wire core inside. After the molding of housing is completed, the piercing terminal, the part where the first needle connects to the main wire and the part where the second needle connects to the sub-wire are all positioned in the housing. In the present application, it is not required to remove the sheaths of the main wire and the sub-wire, the electrical connection between the main wire and the sub-wire can be realized in the molding process of housing by using the piercing terminal, and the connection operation between the main wire and the sub-wire is simple, thus improving the reliability. The manufacturing time of the connection structure of string light is shortened, and the manufacturing cost of the connection structure of string light is reduced.

BRIEF DESCRIPTION OF THE DRAWINGS

The present application will now be further illustrated with the attached drawings and following embodiments.

Figure 1:
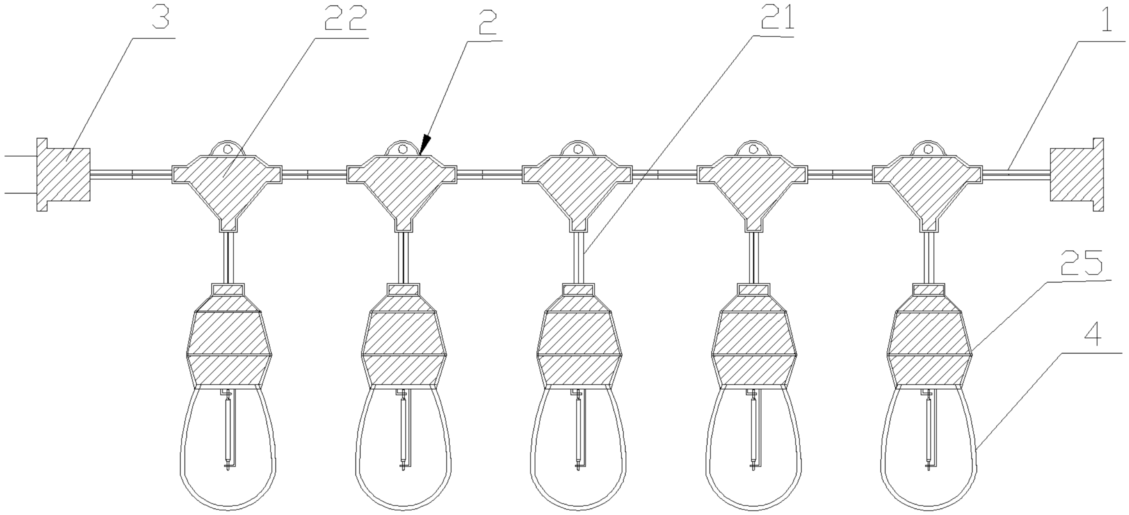
FIG. 1 is a schematic diagram of a string light assembly provided by an embodiment of the present application.

The reference signs in the drawings are as follows:

1. Main wire; 2. Connecting assembly; 21. Sub-wire; 22. Housing; 221. Hanger; 23. Lamp head; 231. Conductive part; 232. Inner sleeve; 24. Piercing terminal; 241. Groove; 242. First needle; 243. Second needle; 244. First terminal; 245. Second terminal; 25. Outer sleeve; 3. Plug; 4. Bulb.

DETAILED DESCRIPTION THE PREFERRED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

It should be understood that the directions or positional relationships indicated by the terms “upper”, “lower”, “left”, “right”, “front”, “back” and “middle” are based on the directions or positional relationships shown in the drawings, only for convenience of describing the present application and simplifying the descriptions, instead of indicating or implying that the device or element must have a specific orientation, be constructed or operated in a specific orientation, and therefore cannot be understood as a limitation of the present application.

As shown in FIG. 1 to FIG. 5, the connection structure of string light provided by an embodiment of the present application comprises a main wire 1 and a plurality of connecting assemblies 2. Each of the connecting assemblies 2 includes a sub-wire 21, a housing 22, a lamp head 23 and a piercing terminal 24 provided with a groove 241; the piercing terminal 24 is further provided with a first needle 242 and a second needle 243, and the piercing terminal 24 covers the main wire 1 and the sub-wire 21 through the groove 241; the first needle 242 pierces the sheath of the main wire 1 and is electrically connected with the main wire 1, and the second needle 243 pierces the sheath of the sub-wire 21 and is electrically connected with the sub-wire 21. Understandably, the piercing terminal 24 may be made of conductive materials such as copper, and the housing 22 may be made of insulating materials such as plastic. A plurality of the first needles 242 and the second needles 243 may be arranged according to actual requirements, so as to ensure that the first needle 242 can penetrate through the sheath of the main wire 1 and touch the conductive wire core, and the second needle 243 can penetrate through the sheath of the sub-wire 21 and touch the conductive wire core.

The housing 22 covers the piercing terminal 24, and an end of the sub-wire 21 far from the piercing terminal 24 passes through the housing 22 and is electrically connected with the lamp head 23. Understandably, the part where the first needle 242 connects with the main wire 1 and the part where the second needle 243 connects with the sub-wire 21 are also positioned inside the housing 22. The lamp head 23 is positioned outside the housing 22.

In the present application, the piercing terminal 24 is provided with a groove 241, a first needle 242 and a second needle 243, and the groove 241 of the piercing terminal 24 covers the main wire 1 and the sub-wire 21. In the molding process the housing 22, the housing 22 would drive the first needle 242 and the second needle 243 to bend, so that the first needle 242 could pierce the sheath of the main wire 1 to contact with its conductive wire core inside, and the second needle 243 could pierce the sheath of the sub-wire 21 to contact with its conductive wire core inside. After the molding of the housing 22 is completed, the piercing terminal 24, the part where the first needle 242 is connected to the main wire 1, and the part where the second needle 243 is connected to the sub-wire 21 are all positioned in the housing 22. In the present application, it is not required to remove the sheaths of the main wire 1 and the sub-wire 21, and the electrical connection between the main wire 1 and the sub-wire 21 can be realized at the molding stage of the housing 22 by using the piercing terminal 24, and the connection operation between the main wire 1 and the sub-wire 21 is simple. In the way, the reliability is improved, the manufacturing time of the connection structure of string light is shortened, and the manufacturing cost of the connection structure of string light is reduced.

Figure 3:
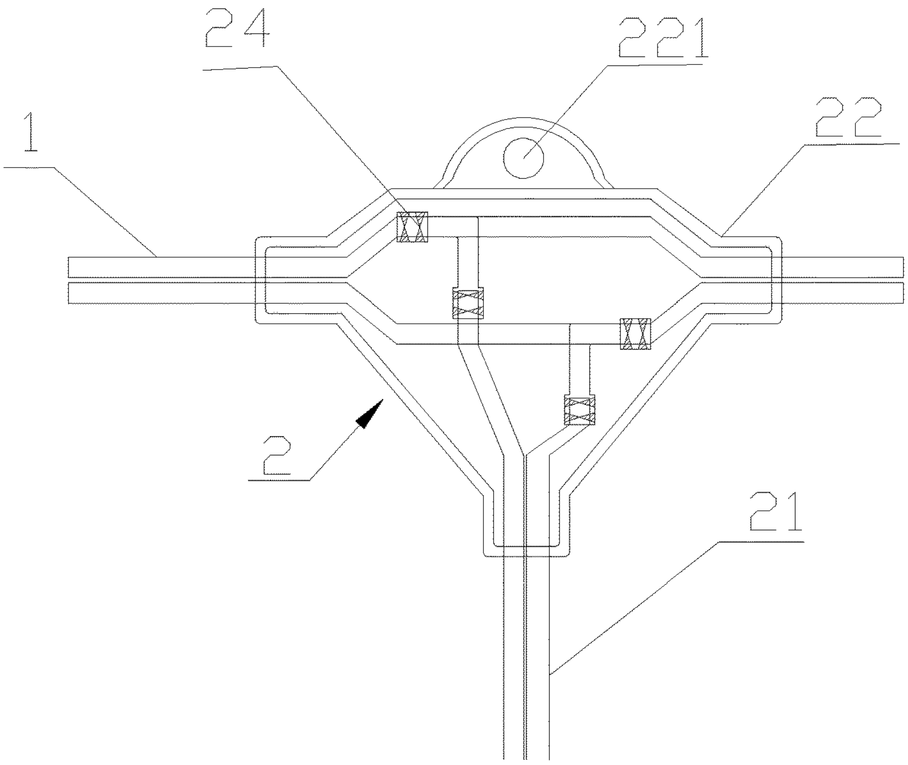
FIG. 3 is a partial schematic diagram of a connection structure of string light provided by an embodiment of the present application.
Figure 4:
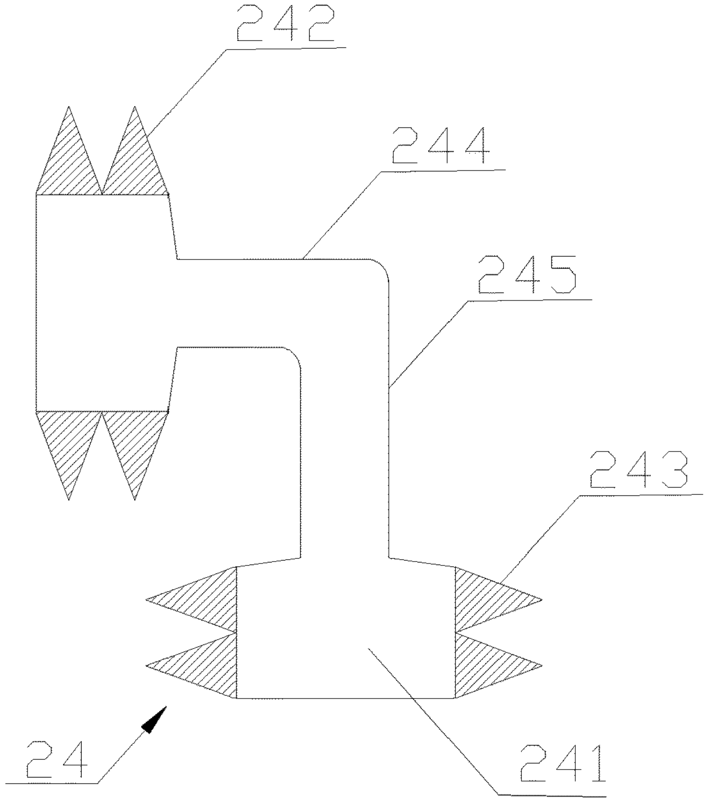
FIG. 4 is a schematic diagram of a piercing terminal of the connection structure of string light provided by an embodiment of the present application.

In an embodiment, as shown in FIGS. 3 and 4, the piercing terminal 24 includes a first terminal 244 and a second terminal 245 connected to the first terminal 244; the groove 241 comprises a first groove arranged on the first terminal 244 and a second groove arranged on the second terminal 245, the first needle 242 is arranged on the first terminal 244 and the second needle 243 is arranged on the second terminal 245. It can be understood that the first terminal 244 and the second terminal 245 are integrally formed structural members, and both the first groove and the second groove may be semicircular groove 241.

The first terminal 244 covers the main wire 1 through the first groove, and the second terminal 245 covers the sub-wire 21 through the second groove. In this embodiment, the first terminal 244 of the piercing terminal 24 is wrapped around the main wire 1, and the second terminal 245 of the piercing terminal 24 is wrapped around the sub-wire 21, thus ensuring the stability of the piercing terminal 24 connecting the main wire 1 and the sub-wire 21.

In an embodiment, as shown in FIG. 4, the center line of the first terminal 244 is perpendicular to the center line of the second terminal 245. Understandably, the design that the first terminal 244 of the piercing terminal 24 is perpendicular to the second terminal 245 makes the main wire 1 perpendicular to the sub-wire 21.

In an embodiment, as shown in FIG. 3 and FIG. 4, the two opposite sides of the first terminal 244 are provided with the first needles 242, and the two opposite sides of the second terminal 245 are provided with the second needles 243. It can be understood that two rows of the first needles 242 may be respectively arranged on the two opposite outer side walls of the first terminal 244, and two rows of the second needles 243 may be respectively arranged on the two opposite outer side walls of the second terminal 245. Specifically, in the molding process of the housing 22, the two rows of the first needles 242 are both bent toward the center of the main wire 1, so that the two rows of the first needles 242 can pierce the sheath of the main wire 1 from two sides and contact with the conductive wire core of the main wire 1, thus ensuring the stability of the electrical connection between the first terminal 244 and the main wire 1. The two rows of the second needles 243 are both bent toward the center of the sub-wire 21, so that the two rows of the second needle 243 can pierce the sheath of the sub-wire 21 from two sides and contact with the conductive wire core of the sub-wire 21, thus ensuring the stability of the electrical connection between the second terminal 245 and the sub-wire 21.

Figure 2:
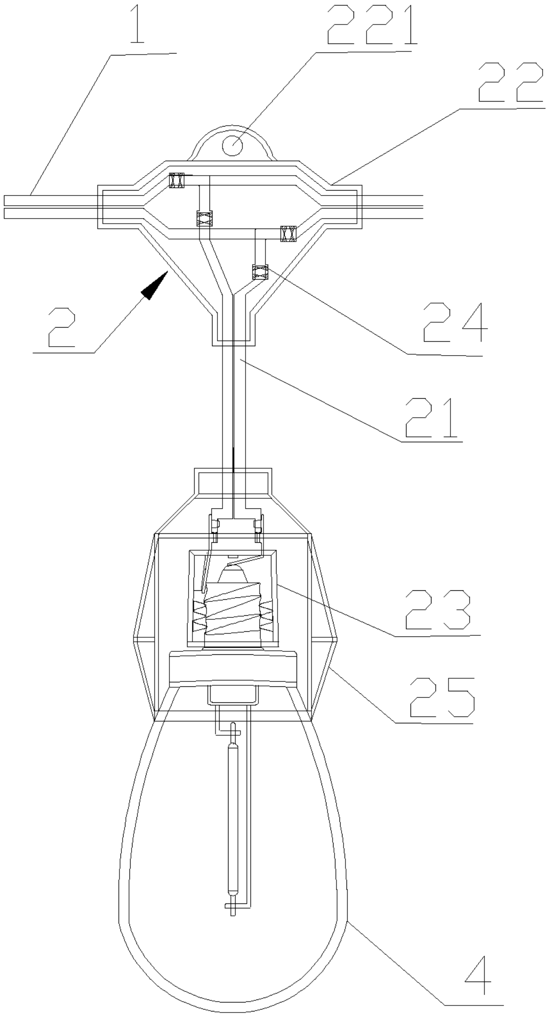
FIG. 2 is a partial schematic diagram of a string light assembly provided by an embodiment of the present application.

In an embodiment, as shown in FIGS. 1 to 3, the housing 22 is further provided with a hanger 221. Understandably, the hanger 221 is arranged at the top of the housing 22, and the connecting assembly 2 may be hung on an external object through the hanger 221, thus improving the convenience of the installation of the connection structure of string light.

In an embodiment, as shown in FIG. 1, the connection structure of string light further includes a plug 3 electrically connected to the main wire 1. Understandably, the plug 3 is connected to one end of the sub-wire 21, and after the plug 3 is plugged into the socket, the connection structure of string light can be electrified.

Figure 6:
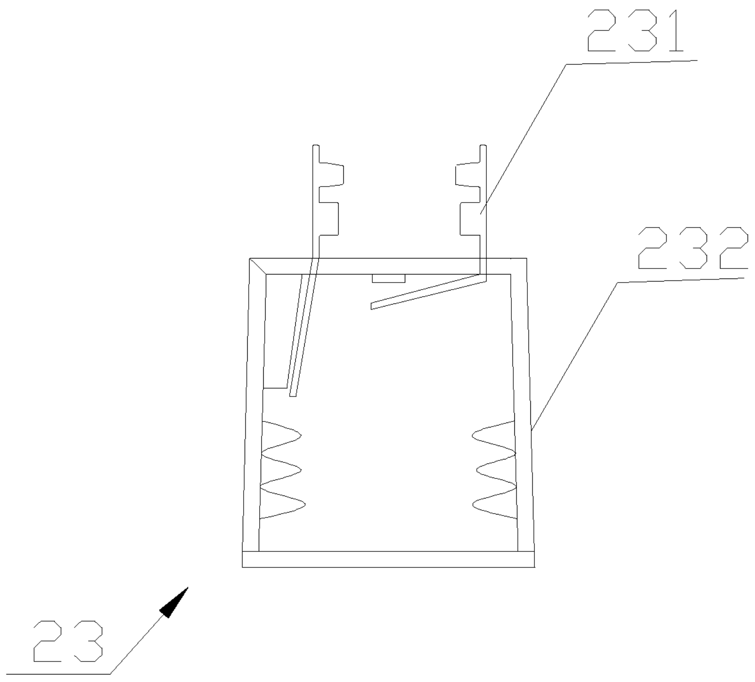
FIG. 6 is a schematic diagram of a lamp head of the connection structure of string light provided by an embodiment of the present application.

In an embodiment, as shown in FIGS. 2 and 6, the lamp head 23 includes a conductive part 231 and an inner sleeve 232 with a first inner hole, and the inner wall of the inner hole is provided with an electrode terminal; an end of the conductive part 231 far from the piercing terminal 24 is electrically connected with an end of the sub-wire 21, and another end of the conductive part 231 extends into the first inner hole and is electrically connected with the electrode terminal. Understandably, the top of the inner sleeve 232 is provided with a first through hole communicating with the first inner hole, and one end of the conductive part 231 passes through the first through hole to contact the electrode terminal in the first inner hole. An external bulb 4 may be plugged into the first inner hole of the inner sleeve 232, so that the sub-wire 21 can supply power to the external bulb 4 plugged into the inner sleeve 232.

Figure 5:
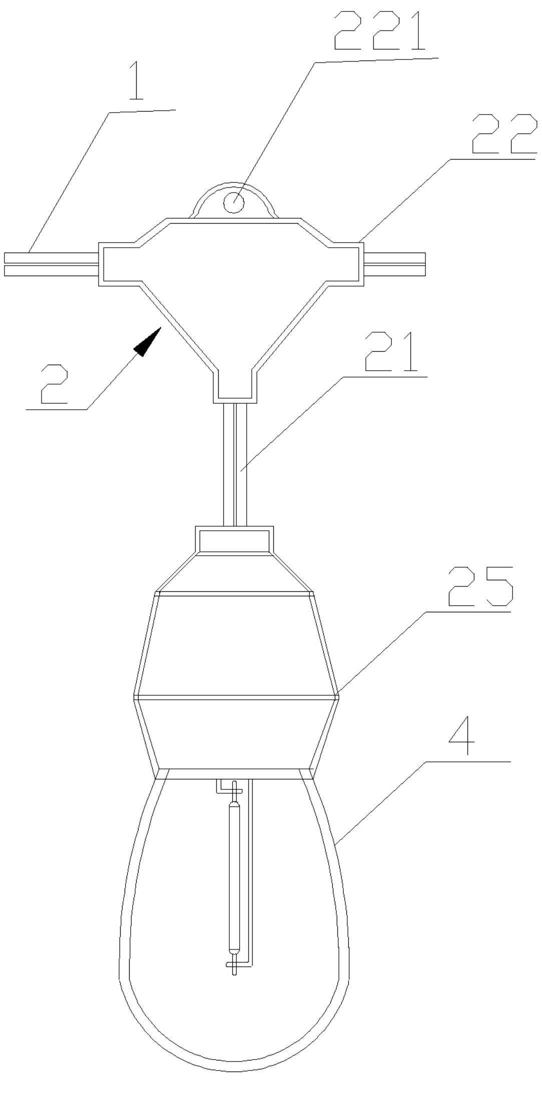
FIG. 5 is a partial schematic diagram of a string light assembly provided by an embodiment of the present application.

In an embodiment, as shown in FIG. 2 and FIG. 5, the connecting assembly 2 further includes an outer sleeve 25 with a second inner hole, and the end of the sub-wire 21 far from the piercing terminal 24 extends into the second inner hole and is electrically connected with the conductive part 231; the inner sleeve 232 and the conductive part 231 are both positioned in the second inner hole. Understandably, the conductive part 231, and the connection part of the conductive part 231 and the sub-wire 21 are both located in the second inner hole of the outer sleeve 25. The design of the outer sleeve 25 ensures the insulation of the connection part of the sub-wire 21 and the lamp head 23.

In an embodiment, as shown in FIGS. 1 and 2, the main wire 1, the sub-wire 21 and the piercing terminal 24 are all provided with two, and each sub-wire 21 is electrically connected with one main wire 1 through one piercing terminal 24. Understandably, the two main wires 1 may be neutral wire and live wire, one of the sub-wires 21 is electrically connected with the live wire through one of the piercing terminals 24, and the other sub-wire 21 is electrically connected with the neutral wire through another piercing terminal 24. The connection parts of the two piercing terminals 24 and the two sub-wires 21, two main wires 1 are all positioned in the same housing 22.

As shown in FIG. 1, another embodiment of the present application further provides a string light assembly, which comprises a plurality of bulbs 4 and the connection structure of string light described above, and each lamp head 23 is used for connecting one bulb 4. It can be understood that each of the connecting assemblies 2 may be connected with one of the bulbs 4, so that the connection structure of string light can supply power to a plurality of bulbs 4.

In a specific embodiment, the bulb 4 is provided with external threads, the inner wall of the first inner hole is provided with internal threads, and the lamp head 23 is inserted into the first inner hole through the internal threads and external threads by threaded connection.

The above descriptions are merely preferred embodiments of the connection structure of string light of the present application, but not intended to limit the present application. Any modifications, equivalent substitutions and improvements made within the spirit and principle of the present application shall be included in the protection scope of the present application.

What is claimed is:

1. A connection structure of string light, comprising a main wire and a plurality of connecting assemblies, each of the connecting assembly comprises a sub-wire, a housing, a lamp head and a piercing terminal provided with a groove, and the piercing terminal is also provided with a first needle and a second needle; the piercing terminal covers the main wire and the sub-wire through the groove, the first needle pierces a sheath of the main wire and is electrically connected with the main wire, and the second needle pierces a sheath of the sub-wire and is electrically connected with the sub-wire;

the housing covers the piercing terminal, and an end of the sub-wire far from the piercing terminal passes through the housing and is electrically connected with the lamp head;

the piercing terminal comprises a first terminal and a second terminal connected with the first terminal, the groove comprises a first groove arranged on the first terminal and a second groove arranged on the second terminal, the first needle is arranged on the first terminal and the second needle is arranged on the second terminal; and the first terminal covers the main wire through the first groove, and the second terminal covers the sub-wire through the second groove.

2. The connection structure of string light of claim 1, wherein a center line of the first terminal is perpendicular to that of the second terminal.

3. The connection structure of string light of claim 1, wherein the two opposite sides of the first terminal are provided with the first needles, and the two opposite sides of the second terminal are provided with the second needles.

4. The connection structure of string light of claim 1, wherein the housing is further provided with a hanger.

5. The connection structure of string light of claim 1, wherein the connection structure of string light further comprises a plug electrically connected with the main wire.

6. The connection structure of string light of claim 1, wherein the lamp head comprises a conductive part and an inner sleeve provided with a first inner hole, and an inner wall of the first inner hole is provided an electrode terminal, an end of the conductive part is electrically connected with an end of the sub-wire far from the piercing terminal, and another end of the conductive part extends into the first inner hole and is electrically connected with the electrode terminal.

7. The connection structure of string light of claim 6, wherein the connecting assembly further comprises an outer sleeve provided with a second inner hole, and an end of the sub-wire far from the piercing terminal extends into the second inner hole and is electrically connected with the conductive part; the inner sleeve and the conductive part are both positioned in the second inner hole.

8. The connection structure of string light of claim 1, wherein the main wire, the sub-wire and the piercing terminal are all provided with two, and each sub-wire is electrically connected with one main wire through one piercing terminal.

9. A string light assembly, comprising a plurality of bulbs and the connection structure of string light of claim 1, wherein each lamp head is used for connecting one bulb.

* * * * *